(12) United States Patent
Montgomery et al.

(10) Patent No.: US 9,511,571 B2
(45) Date of Patent: Dec. 6, 2016

(54) COMPOSITE LAMINATE HAVING A DAMPING INTERLAYER AND METHOD OF MAKING THE SAME

(75) Inventors: Joshua M. Montgomery, Seattle, WA (US); Salvatore L. Liguore, St. Louis, MO (US); Tuan Q. Cao, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1822 days.

(21) Appl. No.: 11/656,626

(22) Filed: Jan. 23, 2007

(65) Prior Publication Data

US 2008/0277057 A1 Nov. 13, 2008

(51) Int. Cl.
| | |
|---|---|
| *B32B 5/02* | (2006.01) |
| *B32B 27/12* | (2006.01) |
| *B32B 27/04* | (2006.01) |
| *B32B 37/00* | (2006.01) |
| *B29C 65/00* | (2006.01) |
| *B32B 33/00* | (2006.01) |
| *B32B 5/26* | (2006.01) |

(Continued)

(52) U.S. Cl.
CPC ............. *B32B 33/00* (2013.01); *B29C 70/086* (2013.01); *B32B 5/26* (2013.01); *B32B 5/28* (2013.01); *B32B 7/02* (2013.01); *B32B 27/04* (2013.01); *B32B 27/12* (2013.01); *B29C 70/08* (2013.01); *B29C 70/24* (2013.01); *B29C 70/44* (2013.01); *B29K 2075/00* (2013.01); *B29K 2995/0046* (2013.01); *B32B 2038/0076* (2013.01); *B32B 2307/56* (2013.01); *Y02T 50/433* (2013.01); *Y10T 428/24322* (2015.01); *Y10T 428/24488* (2015.01); *Y10T 428/24995* (2015.04)

(58) Field of Classification Search
None
See application file for complete search history.

(56) References Cited

U.S. PATENT DOCUMENTS

| | | | |
|---|---|---|---|
| 2,819,032 A | 1/1958 | Detrie et al. | |
| 3,020,986 A | 2/1962 | Kirk et al. | |

(Continued)

FOREIGN PATENT DOCUMENTS

| | | |
|---|---|---|
| EP | 1500494 A2 | 1/2005 |
| EP | 07 874 425.7 | 7/2011 |

(Continued)

OTHER PUBLICATIONS

M. J. Robinson and J.B. Kosmatka, "Improved Damping in VARTM Composite Structures using Perforated Viscoelastic Layers", Journal of Composite Materials, Nov. 23, 2006, vol. 40.

(Continued)

*Primary Examiner* — Jennifer Chriss
*Assistant Examiner* — Camie Thompson
(74) *Attorney, Agent, or Firm* — Yee & Associates, P.C.

(57) ABSTRACT

Composite laminates used in structural applications include an interlayer of soft material that provides damping action to reduce noise and vibration. The interlayer may comprise a viscoelastic material which deforms under stress caused by shock, noise or vibration. A reinforcement may be embedded in the viscoelastic material to maintain the mechanical strength and stiffness of the laminate. The reinforcement may include individual or woven fibers or ridged tubes that provide the interlayer with stiffness.

23 Claims, 5 Drawing Sheets

(51) Int. Cl.
  *B32B 5/28* (2006.01)
  *B32B 7/02* (2006.01)
  *B29C 70/08* (2006.01)
  *B29C 70/24* (2006.01)
  *B29C 70/44* (2006.01)
  *B29K 75/00* (2006.01)
  *B32B 38/00* (2006.01)

(56) References Cited

U.S. PATENT DOCUMENTS

| | | |
|---|---|---|
| 3,078,969 A | 2/1963 | Painter et al. |
| 3,078,971 A | 2/1963 | Wallerstein |
| 3,088,561 A | 5/1963 | Ruzicka |
| 3,159,249 A | 12/1964 | Lazan |
| 3,160,549 A | 12/1964 | Caldwell et al. |
| 3,193,049 A | 7/1965 | Wollek |
| 3,832,955 A | 9/1974 | Pottinger et al. |
| 4,182,495 A | 1/1980 | Borgmeier et al. |
| 4,317,503 A | 3/1982 | Soderquist et al. |
| 4,401,495 A | 8/1983 | McKinney |
| 4,416,349 A | 11/1983 | Jacobs |
| 4,425,980 A | 1/1984 | Miles |
| 4,428,454 A | 1/1984 | Capaul et al. |
| 4,463,044 A | 7/1984 | McKinney |
| 4,477,304 A | 10/1984 | Westermann |
| 4,522,165 A | 6/1985 | Ogawa |
| 4,553,631 A | 11/1985 | Panza |
| 4,556,439 A | 12/1985 | Bannink, Jr. |
| 4,591,402 A | 5/1986 | Evans et al. |
| 4,608,220 A | 8/1986 | Caldwell et al. |
| 4,611,687 A | 9/1986 | Nixon |
| 4,635,882 A | 1/1987 | SenGupta et al. |
| 4,678,707 A | 7/1987 | Shinozaki et al. |
| 4,699,683 A | 10/1987 | McCowin |
| 4,767,656 A | 8/1988 | Chee et al. |
| 4,786,343 A | 11/1988 | Hertzberg |
| 4,828,202 A | 5/1989 | Jacobs et al. |
| 4,851,501 A | 7/1989 | Lubowitz et al. |
| 4,860,851 A | 8/1989 | Krevor et al. |
| 4,877,471 A | 10/1989 | McCowin et al. |
| 4,882,007 A | 11/1989 | Lengen et al. |
| 4,931,340 A | 6/1990 | Baba et al. |
| 4,966,802 A | 10/1990 | Hertzberg |
| 5,024,399 A | 6/1991 | Barquet et al. |
| 5,063,098 A | 11/1991 | Niwa et al. |
| 5,087,491 A | 2/1992 | Barrett |
| 5,106,668 A | 4/1992 | Turner et al. |
| 5,151,311 A | 9/1992 | Parente et al. |
| 5,165,627 A | 11/1992 | Amano et al. |
| 5,178,717 A | 1/1993 | Rodriguez |
| 5,200,019 A | 4/1993 | Brandis et al. |
| 5,232,073 A | 8/1993 | Bronowicki et al. |
| 5,256,223 A | 10/1993 | Alberts et al. |
| 5,268,055 A | 12/1993 | Bales et al. |
| 5,277,958 A | 1/1994 | Tomkins |
| 5,308,675 A | 5/1994 | Crane et al. |
| 5,368,914 A | 11/1994 | Barrett |
| 5,445,861 A | 8/1995 | Newton et al. |
| 5,507,477 A | 4/1996 | Manning et al. |
| 5,527,414 A | 6/1996 | Dublinski et al. |
| 5,604,010 A | 2/1997 | Hartz et al. |
| 5,622,733 A | 4/1997 | Asher |
| 5,667,866 A | 9/1997 | Reese, Jr. |
| 5,700,347 A | 12/1997 | McCowin |
| 5,710,396 A | 1/1998 | Rogers |
| 5,712,017 A | 1/1998 | Jordan |
| 5,744,221 A | 4/1998 | Crane et al. |
| 5,851,336 A | 12/1998 | Cundiff et al. |
| 5,866,272 A | 2/1999 | Westre et al. |
| 5,895,013 A | 4/1999 | Towfiq |
| 5,902,755 A | 5/1999 | Driggett et al. |
| 5,904,318 A | 5/1999 | Towfiq |
| 5,916,954 A | 6/1999 | Bohn et al. |
| 5,958,556 A | 9/1999 | McCutcheon |
| 6,065,717 A | 5/2000 | Boock |
| 6,110,985 A | 8/2000 | Wheeler |
| 6,114,050 A | 9/2000 | Westre et al. |
| 6,117,518 A | 9/2000 | Cawse et al. |
| 6,179,086 B1 | 1/2001 | Bansemir et al. |
| 6,399,199 B1 | 6/2002 | Fujino et al. |
| 6,419,774 B1 | 7/2002 | Clifford |
| 6,497,190 B1 | 12/2002 | Lewit |
| 6,510,961 B1 | 1/2003 | Head et al. |
| 6,632,502 B1 | 10/2003 | Allen et al. |
| 6,659,223 B2 | 12/2003 | Allison et al. |
| 6,696,164 B2 | 2/2004 | Clifford et al. |
| 6,755,998 B1 | 6/2004 | Reichard et al. |
| 6,764,754 B1 | 7/2004 | Hunter et al. |
| 6,878,320 B1 | 4/2005 | Alderson et al. |
| 7,040,575 B2 | 5/2006 | Struve et al. |
| 7,063,763 B2 | 6/2006 | Chapman, Jr. |
| 7,074,474 B2 | 7/2006 | Toi et al. |
| 7,083,147 B2 | 8/2006 | Movsesian et al. |
| 7,134,629 B2 | 11/2006 | Johnson et al. |
| D533,950 S | 12/2006 | Givoni |
| 7,160,621 B2 | 1/2007 | Chaudhari et al. |
| 7,181,891 B2 | 2/2007 | Surace et al. |
| 7,197,852 B2 | 4/2007 | Grillos |
| 7,213,629 B2 | 5/2007 | Ledet et al. |
| 7,282,107 B2 | 10/2007 | Johnson et al. |
| 7,291,373 B2 | 11/2007 | Bartley-Cho et al. |
| 7,325,771 B2 | 2/2008 | Stulc et al. |
| 7,364,221 B2 | 4/2008 | Tahri et al. |
| 7,419,031 B2 | 9/2008 | Liguore et al. |
| 7,419,627 B2 | 9/2008 | Sheu et al. |
| 7,503,368 B2 | 3/2009 | Chapman et al. |
| 7,527,222 B2 | 5/2009 | Biornstad et al. |
| 7,578,468 B2 | 8/2009 | Drost |
| 7,681,615 B2 | 3/2010 | McCowin |
| 7,766,063 B2 | 8/2010 | Lauder et al. |
| 7,798,285 B2 | 9/2010 | Chiou et al. |
| 7,837,147 B2 | 11/2010 | Liguore et al. |
| 7,931,240 B2 | 4/2011 | Kothera et al. |
| 8,042,768 B2 | 10/2011 | Liguore et al. |
| 8,105,523 B2 | 1/2012 | Edelmann et al. |
| 8,181,417 B2 | 5/2012 | Surace et al. |
| 2002/0178992 A1 | 12/2002 | Lewit |
| 2003/0066708 A1 | 4/2003 | Allison et al. |
| 2003/0168555 A1 | 9/2003 | Livi et al. |
| 2005/0016671 A1 | 1/2005 | Sharp |
| 2005/0039843 A1 | 2/2005 | Johnson et al. |
| 2005/0194210 A1 | 9/2005 | Panossian |
| 2005/0211838 A1 | 9/2005 | Struve et al. |
| 2006/0108058 A1 | 5/2006 | Chapman et al. |
| 2006/0118244 A1 | 6/2006 | Zaballos et al. |
| 2006/0145006 A1 | 7/2006 | Drost |
| 2006/0208135 A1 | 9/2006 | Liguore et al. |
| 2006/0260751 A1 | 11/2006 | Lauder et al. |
| 2007/0029030 A1 | 2/2007 | McCowin |
| 2007/0069080 A1 | 3/2007 | Rassaian et al. |
| 2007/0071957 A1* | 3/2007 | Atkins et al. ............. 428/292.1 |
| 2007/0094950 A1 | 5/2007 | Surace et al. |
| 2007/0095982 A1 | 5/2007 | Kismarton et al. |
| 2007/0102239 A1 | 5/2007 | Liguore et al. |
| 2007/0125474 A1 | 6/2007 | Barker et al. |
| 2008/0029644 A1 | 2/2008 | Martinez Cerezo et al. |
| 2008/0035788 A1 | 2/2008 | Kothera et al. |
| 2008/0230652 A1 | 9/2008 | Biornstad et al. |
| 2008/0282863 A1 | 11/2008 | McCowin |
| 2009/0026315 A1 | 1/2009 | Edelmann et al. |
| 2010/0133039 A1 | 6/2010 | Liguore |
| 2010/0133380 A1 | 6/2010 | Roebroeks et al. |
| 2010/0230202 A1 | 9/2010 | Anderson et al. |
| 2010/0282904 A1 | 11/2010 | Kismarton et al. |
| 2010/0320319 A1 | 12/2010 | Liguore et al. |
| 2012/0097321 A1 | 4/2012 | Liguore et al. |

FOREIGN PATENT DOCUMENTS

| | | |
|---|---|---|
| GB | 2390999 A | 1/2004 |
| WO | 0001524 A1 | 1/2001 |
| WO | 2007137607 A1 | 12/2007 |

(56) References Cited

FOREIGN PATENT DOCUMENTS

WO 2008115301 A2 9/2008
WO PCT/US2007/087267 10/2008

OTHER PUBLICATIONS

"Aircraft Damping Composites," ADC Product Bulletin, Aearo Specialty Composites, copyright 2012, 4 Pages, accessed May 16, 2012, http://http://www.earaircraft.com/img/uploads/lit/news_1.pdf.

"Strip," Random House, Inc., copyright 2012, 1 Page, accessed May 16, 2012, http://dictionary.reference.com/browse/strip.

USPTO Notice of Allowance, dated Mar. 31, 2004, regarding U.S. Appl. No. 10/620,066, 9 pages.

USPTO Office Action, dated Jul. 9, 2008, regarding U.S. Appl. No. 11/084,779, 18 pages.

USPTO Office Action, dated Jan. 21, 2009, regarding U.S. Appl. No. 11/084,779, 16 pages.

USPTO Final Office Action, dated Jun. 24, 2009, regarding U.S. Appl. No. 11/084,779, 14 pages.

USPTO Office Action, dated Nov. 9, 2009, regarding U.S. Appl. No. 11/084,779, 8 pages.

USPTO Notice of Allowance, dated May 6, 2010, regarding U.S. Appl. No. 11/084,779, 6 pages.

USPTO Office Action, dated Feb. 17, 2011, regarding U.S. Appl. No. 12/851,431, 15 pages.

USPTO Notice of Allowance, dated Jul. 26, 2011, regarding U.S. Appl. No. 12/851,431, 7 pages.

USPTO Office Action, dated Mar. 16, 2012, regarding U.S. Appl. No. 13/280,204, 20 pages.

USPTO Office Action, dated Jan. 13, 2010, regarding U.S. Appl. No. 12/404,270, 12 pages.

USPTO Final Office Action, dated May 25, 2010, regarding U.S. Appl. No. 12/404,270, 15 pages.

USPTO Office Action, dated Apr. 14, 2011, regarding U.S. Appl. No. 12/404,270, 11 pages.

USPTO Final Office Action, dated Sep. 7, 2011, regarding U.S. Appl. No. 12/404,270, 18 pages.

USPTO Notice of Allowance, dated Jun. 25, 2012, regarding U.S. Appl., No. 13/280,204, 7 pages.

PCT Application No. PCT/US2007/087267, filed Dec. 12, 2007, 33 pages.

Biggerstaff et al., "Shear Measurements of Viscoelastic Damping Materials Embedded in Composite Plates," Journal of Composite Materials, 1999, vol. 33, 11 pages.

Damping Technologies, Inc., "Stand-Off Damping Systems," undated, 4 pages.

Roush Industries, Inc., "Damped Viscoelastic Acyrlic Adhesive—RA980," 2004, 2 pages.

Notice of Allowance, dated Dec. 24, 2012, regarding U.S. Appl. No. 12/404,270, 28 pages.

Office Action, dated Apr. 2, 2014, regarding U.S. Appl. No. 13/850,647, 21 pages.

\* cited by examiner

COMPOSITE LAMINATE HAVING A DAMPING INTERLAYER AND METHOD OF MAKING THE SAME

TECHNICAL FIELD

This disclosure generally relates to composite laminates used in structural applications, especially aircraft, and deals more particularly with a composite laminate having a reinforced interlayer that provides structural damping.

BACKGROUND

Composite materials such as carbon fiber reinforced epoxy resin are used in aircraft applications because of their light weight and high strength, compared to metals such as aluminum. More recently, these composite materials have been used in the fuselage structure which surrounds interior cabins in the aircraft. The use of composite materials in the fuselage structure presents an opportunity to reduce engine and aerodynamic noise, as well as vibration transmission to the interior of the aircraft.

In order to reduce noise and vibration, "add-on" parts may be installed on the aircraft which function to at least partially damp vibrations and noise to prevent propagation to the interior cabin. In order to adequately reduce noise and vibration, a relatively large number of these add-on parts may be necessary which are costly both in terms of material and labor installation costs. Moreover, these additional parts add to the weight of the aircraft.

Designing aircraft structures such as a fuselage having high inherent damping is particularly challenging when using composite materials. The composite material is typically cured at relatively high temperatures and pressures, in contrast to the operating conditions of the aircraft in which the fuselage skin typically encounters temperatures approaching −60° F. or lower at typical flight altitudes. Thus, engineering a damping material system that performs well at cold temperatures (normally requiring a very soft material) but can survive the heat and pressure when co-cured with the base material, may be particularly difficult. The ideal material that performs well at such cold operating temperatures has a very low glass transition temperature (Tg), such that it is in a soft transition phase at operating temperatures. Further, in order to use thin films of the damping material at these cold temperatures for low-weight applications, the modulus of elasticity of the material will typically be very low compared to the carbon/epoxy composite. Thus, the use of relatively soft materials to provide inherent damping within composite material structures may make it less stiff since the relatively soft damping material is substantially less stiff than the typical plies of carbon fiber reinforced plastics (CFRP), sometimes also referred to as organic composite materials.

Accordingly, there is a need for a composite material structure that has relatively high inherent damping qualities without materially reducing the stiffness and other mechanical performance characteristics of the structure. Embodiments of the disclosure are directed towards satisfying this need.

SUMMARY

An embodiment of the disclosure provides a damped composite laminate, which may include at least first and second layers of a reinforced resin material, and a third layer of damping material co-cured to first and second layers. The third layer of damping material may include a viscoelastic material having a reinforcement medium for stiffening the viscoelastic material. The reinforcement medium may include fibers embedded in the viscoelastic material. The fibers may have a length extending in a direction generally transverse to the planes of the first and second layers. The fibers may be formed of glass or carbon tow or a lightweight synthetic cloth, which are impregnated or coated with the viscoelastic material. The fibers may be formed of a second viscoelastic material, having a glass transition temperature greater than the glass transition temperature of the viscoelastic material in which the fibers are embedded. The third layer may include graphite nano-fibers or nano-tubes (Multi-wall (MWNT) or Single-Wall (SWNT)), or nano or micro sized particles dispersed within the viscoelastic material. The nano-fibers or nano-tubes or particles may be contained in a film of viscoelastic material, such as thermoplastic polyurethane.

In accordance with another embodiment, a composite laminate structure is provided, which may include at least first and second layers of a carbon fiber reinforced plastics (CFRP), and a third layer of reinforced viscoelastic material between the first and second layers. The viscoelastic material may be a thermoplastic polyurethane, or other highly damped polymer, such acrylic, or latex rubber. The third layer may not be continuous, but rather may have discontinuities that bridge between the first and second layer. The bridging may be accomplished with a narrow strip of high modulus carbon-organic resin prepreg, or slit-tape. The slit-tape may have a length that runs transverse to the longitudinal stiffeners of the aircraft fuselage. The bridging may also be accomplished by introducing perforations in the viscoelastic material that are filled with resin migrating from the first and second layers during curing. The bridging may be accomplished through the introduction of fiber tow that run perpendicular (Z-Fiber) to the first and second layers, through the thickness of the third layer. The length of these fiber tows may exceed the thickness of the third layer, such that their ends extend into the first and second layers. These fiber tows may consist of carbon or glass fibers and may be pre-impregnated with epoxy or suitable organic resins. The third layer is co-cured with the first and second layers so that the composite laminate is provided with a reinforced interlayer that provides inherent damping of the structure.

Another embodiment of the disclosure provides a method for making a damped composite laminate structure. The method may comprise the steps of placing a layer of damping material between first and second layers of carbon fiber reinforced plastic (CFRP) material, and co-curing the layer of damping material with the first and second layers. The co-curing is achieved by compressing the first and second layers with the layer of damping material, and co-curing the first and second layers along with the layer of damping material. The layer of damping material may be attached to the first layer following which the second layer is applied over the layer of damping material. The method may further include introducing reinforcement into the layer of damping material before co-curing is performed. The introduction of reinforcement into the layer of damping material may include providing a reinforcement medium and infusing the reinforcement medium with a viscoelastic material.

A further embodiment of the disclosure provides a method of making a composite laminate structure which may comprise the steps of forming first and second pre-pregs; forming a layer of damping material that provides the structure with damped qualities; forming a lay-up by placing the layer of damping material between the first and second pre-pregs; and, co-curing the lay-up. The first and second pre-pregs along with the damping layer are compressed during co-curing. The first and second pre-pregs may be formed by laying up multiple plies of a carbon fiber reinforced plastic material such as carbon epoxy composites. The layer of damping material may be prepared by forming a pre-preg of thermoplastic coated reinforcing fibers comprising either individual fibers or a web of reinforcing fibers.

These and further features, aspects and advantages of the embodiments will become better understood with reference to the following illustrations, description and claims.

BRIEF DESCRIPTION OF THE ILLUSTRATIONS

DETAILED DESCRIPTION

Figure 1:
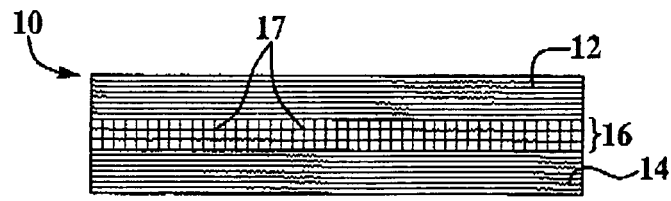
FIG. 1 is a cross sectional illustration of a composite laminate structure having a damping interlayer according to one embodiment of the disclosure.

FIG. 1 illustrates a damped composite laminate structure 10 comprising first and second layers 12, 14 respectively, and an interlayer 16 disposed between and co-cured to the first and second layers 12, 14. Layers 12, 14 may each comprise a plurality of plies of a reinforced synthetic material, such as a carbon fiber reinforced epoxy resin and carbon fiber reinforced plastic material. The interlayer 16 may include a reinforcement 17. The reinforcement 17 may be a woven or a knitted fabric comprising continuous fibrous strands in the form of yarn, tow, roving, tape or resin, impregnated with a viscoelastic material. The reinforcement 17 may also comprise a second viscoelastic material, in fiber form. The reinforcing fibers forming reinforcement 17 may have a direction of orientation in which all of the fibers in an individual layer extend parallel to each other, and the direction of orientation of adjacent layers have differing angles so as to improve the mechanical characteristics, and particularly the stiffness of the laminate structure 10.

The interlayer 16 may be formed of a material that is relatively soft, compared to the first and second layers 12, 14, such as, without limitation, a viscoelastic material (VEM). VEMs encompass a variety of material classified as thermoplastics, thermoplastic elastomers or thermosets. The VEM should have a high loss tangent, or ratio of loss modulus to storage modulus, in order to provide the laminate structure 10 with damping properties. The glass transition temperature (Tg) of the VEM material should be below the operating temperature, such that the VEM is operating in its soft transition phase. Tg is the approximate midpoint of the temperature range of which glass transition takes place, and is the temperature at which increase molecular mobility results in significant changes in the property of a cured resin system. Generally, polymers may be less than usefully ductile or soft below their glass transition temperature, but can undergo large elastic/plastic deformation above this temperature.

The VEM may have a modulus that is approximately 2 or more orders of magnitude less than the modulus of the resin used in the plies of the first and second layers 12, 14. As a result of the relative softness of the VEM forming the interlayer 16, the interlayer 16 may be made relatively thin, but yet remains effective at very cold temperatures, resulting in a weight-efficient design. More particularly, the relative softness of the interlayer 16 allows the first and second layers 12, 14 to move relative to each other in their respective planes, which strains the VEM in the interlayer 16 in shear. The shear strain in the VEM within the interlayer 16, along with its high loss tangent property, allows the laminate structure 10 to dissipate energy from shock, vibration and acoustic excitation. The reinforcement 17 reinforces the interlayer 16 so that mechanical properties, such as stiffness, of the laminate structure 10 are not diminished by the presence of the relatively soft VEM in the interlayer 16.

The damping action of the laminate structure 10 arises from a phase lag between the applied stress and strain response of the VEM. The damping or loss tangent is the phase angle between the stress and strain, which is an inherent material property. The phase lag is a result of the relaxation of the long chain-like molecules. Damping or relaxation decreases with higher pre-load (static) but increases with larger (dynamic) alternating stress. In designing the laminate structure 10, it is desirable to increase the strain in the VEM within the interlayer 16. The shear strain in the VEM may be optimized based on its location in the carbon epoxy laminate structure 10. The strain can also be increased using local inclusions such as, without limitation, particles or chopped carbon fibers. These inclusions increase the strain in the polymer interlayer 16, thereby increasing the energy dissipation action within the laminate structure 10.

Figure 2:
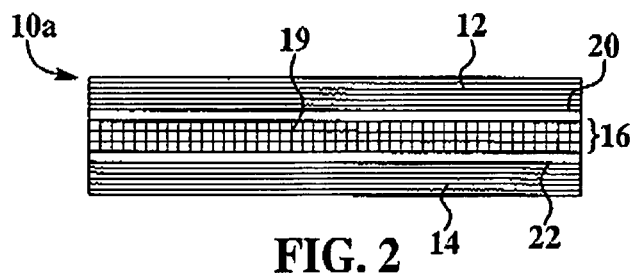
FIG. 2 is a cross sectional illustration of a composite laminate structure having a damping interlayer according to another embodiment of the disclosure.

Another embodiment of the laminate structure 10a is shown in FIG. 2, which has an interlayer 16 that may be formed of an open weave net 19 or cloth of VEM fibers or strips having a glass transition temperature Tg that provides sufficient stiffness at the full range of operating temperatures of the aircraft, yet which provides high damping when placed in shear The VEM 19 net is impregnated with a VEM resin having a relatively low Tg so that the VEM matrix surrounding the VEM net 19 remains relatively soft at the full range of the aircraft's operating temperatures. The VEM matrix may comprise, for example, without limitation, a thermoplastic or thermoplastic elastomer with a low Tg and high loss tangent, and the VEM net 19 may comprise a thermoplastic polyurethane or other synthetic fiber cloth that is impregnated with the VEM.

In the embodiment shown in FIG. 2, optional barrier layers 20, 22 are formed, respectively between the interlayer 16, and the first and second layers 12, 14. The barrier layers 20, 22 may comprise a material such as, without limitation, another thermoplastic, or nylon fabric (Cerex)) that is chemically and thermally compatible with the epoxy resin. The barrier layers 20, 22 function to limit the migration of VEM in the interlayer 16 and epoxy resin in layers 12, 14 so that these two materials are separated and prevented from mixing together. Mixing the VEM and epoxy resin may reduce the damping properties of the interlayer 16. In one embodiment providing satisfactory results, the barrier layers 20, 22 may be between 0.0005 inches to 0.002 inches thick. The barrier layers 20, 22 may also function to make the VEM film more suitable to be dispensed using an automated tape laying machine. Each of the barrier layers 20, 22 is relatively stiff so as to allow VEM film to be peeled off of a roll when used in automated fiber placement manufacturing using a Multi-Head Tape Layer (MHTL) Machine.

Figure 3:
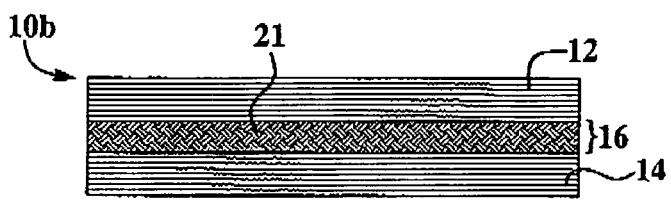
FIG. 3 is a cross sectional illustration of a composite laminate structure having a damping interlayer according to another embodiment of the disclosure.

FIG. 3 depicts another embodiment of the laminate structure 10b in which the interlayer 16 is formed from a woven or knitted cloth 21 of carbon fibers where the fiber strands are alternately arranged in a cross-ply (i.e. 0/90°) or angle-ply (+θ/−θ) configuration. The carbon fiber cloth 21 is impregnated with a low Tg VEM. The VEM may comprise a film of material such as thermoplastic polyurethane or other resin matrix which is hot pressed onto the carbon fiber cloth 21.

Figure 4:
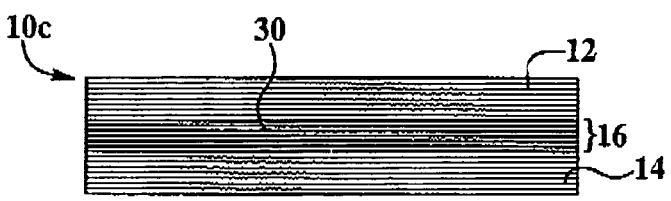
FIG. 4 is a cross sectional illustration of a composite laminate structure having a damping interlayer according to another embodiment of the disclosure.
Figure 5:
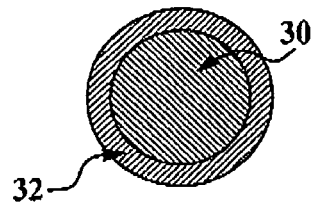
FIG. 5 is a cross sectional illustration of a wetted reinforcing fiber which may be used in the composite laminate structure shown in FIG. 4.
Figure 6:
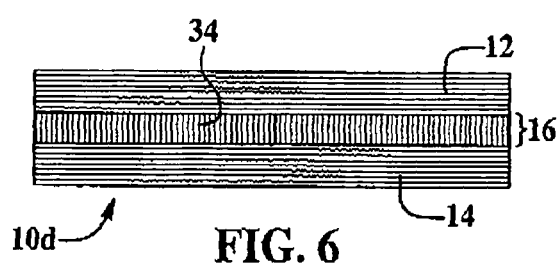
FIG. 6 is a cross sectional illustration of a composite laminate structure having a damping interlayer according to another embodiment of the disclosure.

A further embodiment of the laminate structure 10c is shown in FIGS. 4 and 5 in which the interlayer 16 is formed of unidirectional carbon fiber tows 30 which are coated with a VEM 32. As shown in FIG. 6, the carbon fibers within the tow 30 may be completely wetted with the VEM 32. Glass fibers may be substituted for the carbon fiber tows 30, depending on the application. In the embodiment shown in FIGS. 4 and 5, the carbon or glass fibers 30 provide the required mechanical stiffness and strength for the interlayer 16, while the VEM coating 32 on the fibers 30 provides the desired damping. Because the damping mechanism provided by the VEM material 32 is largely from extension, rather than shear in the embodiment of FIGS. 4 and 5, the interlayer 16 may be placed at various locations within the laminate structure 10c. For example, where the layers 12, 14 each comprise multiple plies of composite material, the interlayer 16 may be disposed between any of the plies in either the layers 12 or the layers 14, or both. More than one interlayer 16 be used, depending on the application, and these multiple interlayers 16 be positioned next to each other or between any of the plies within layers 12, 14.

Figure 7:
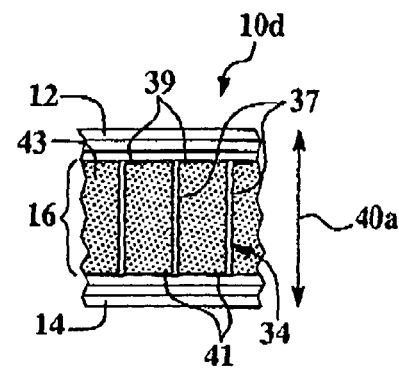
FIG. 7 is an enlarged, fragmentary illustration of a portion of the composite laminate structure shown in FIG. 6.
Figure 8:
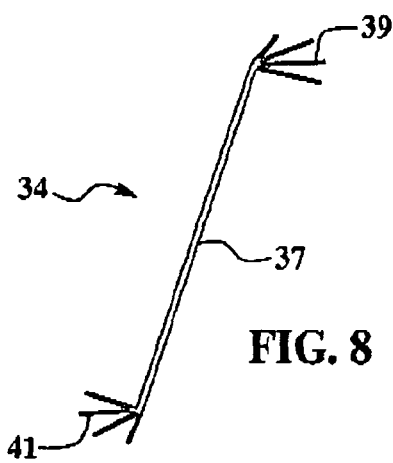
FIG. 8 is a perspective illustration of a single Z-fiber used in the interlayer shown in FIGS. 6 and 7.

A further embodiment 10d is shown in FIGS. 6-12, in which the interlayer 16 is formed by a plurality of Z-fibers 34 (thru the thickness fibers) held within a VEM matrix 43. Fibers 34 are referred to as "Z" fibers due to their inserted orientation in what is conventionally the geometrical Z-direction, perpendicular to the plane of the layers 12, 14. Each of the Z-fibers 34 comprises a tow 37 of reinforcing fibers such as glass or carbon fibers, having ends 39, 41 that fan out as individual fibers oriented perpendicular to the main body of the tow 37. As can be seen in FIG. 7, the tow body 37 extends generally perpendicular to layers 12, 14, and the individual fiber strands on the ends 39, 41 are respectively co-cured with laminate layers 12, 14.

The Z-fibers 34 are introduced into the VEM matrix 43, which can be a film, with known insertion methods such that their ends 39, 41 extend beyond both sides of the VEM 43. As best seen on FIG. 7, the ends 39, 41 of the fiber tows 37 anchor the fibers 34 to and/or within the stiffer materials of the layers 12, 14 on both sides of the VEM 43 in order to transfer loads through the "Z" direction 40a. Thus, the space between the Z-fibers 34 is occupied with VEM material 43 which provides the interlayer 16 with the necessary damping qualities. The Z-fibers 34 effectively mechanically connect laminate layers 12, 14, thereby providing the interlayer 16 with the necessary rigidity, and increasing the bending stiffness of the interlayer 16.

Figure 9:
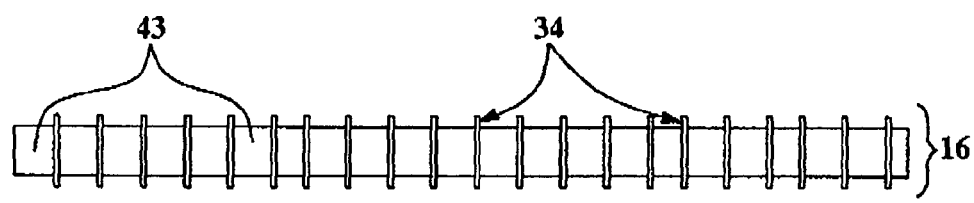
FIG. 9 is a side elevation illustration of a VEM interlayer having Z-fibers pre-inserted therein.
Figure 10:
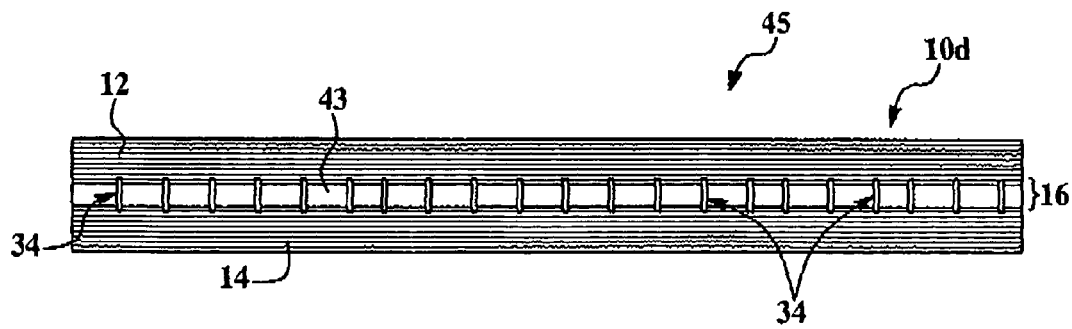
FIG. 10 is a view similar to FIG. 9, but showing laminate layers having been pressed onto opposite sides of the VEM interlayer.

As shown in FIG. 9, the interlayer 16 may be prepared by inserting the Z-fibers 34 into a film 43 of the VEM, using conventional inserting equipment. With the Z-fibers 34 having been pre-inserted into the film 43, the film 43 is then placed in a lay-up 45, between the layers 12, 14, as shown in FIG. 10. The lay-up 45 is then compacted and cured at elevated temperature using conventional techniques.

Figure 11:
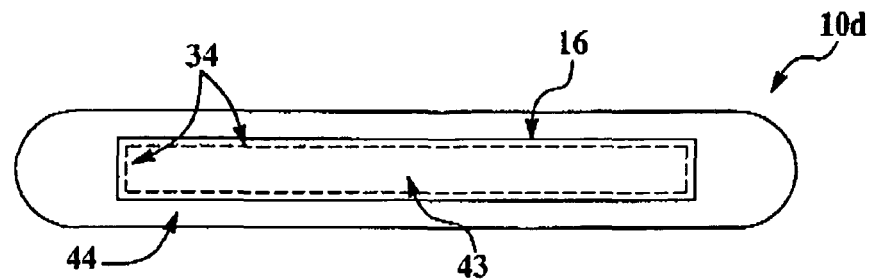
FIG. 11 is a plan, cross sectional illustration of a composite laminate structure having Z-fibers distributed around the perimeter of a VEM interlayer.
Figure 12:
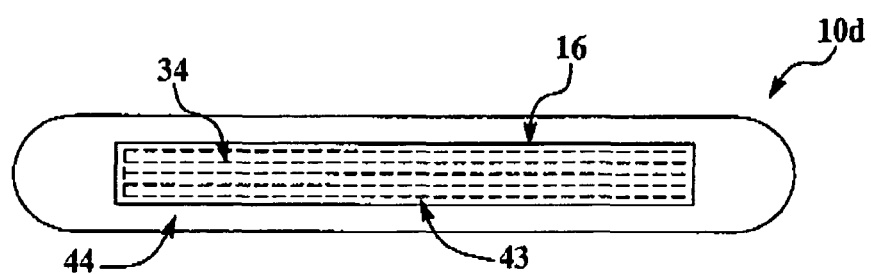
FIG. 12 is an illustration similar to FIG. 11, but showing Z-fibers uniformly distributed across the VEM interlayer.

The Z-fibers 34 can be arranged in various lay-outs within the interlayer 16. For example, FIG. 11 shows an aircraft skin section 44 which includes an interlayer 16 of VEM 43. Z-fibers 34 are inserted into the VEM layer 44, around the perimeter of the VEM film 43. The Z-fibers 34 may also be inserted in a uniform pattern over the interlayer 16, as illustrated by the matrix lay-out of Z-fibers 34 shown in FIG. 12.

Figure 13:
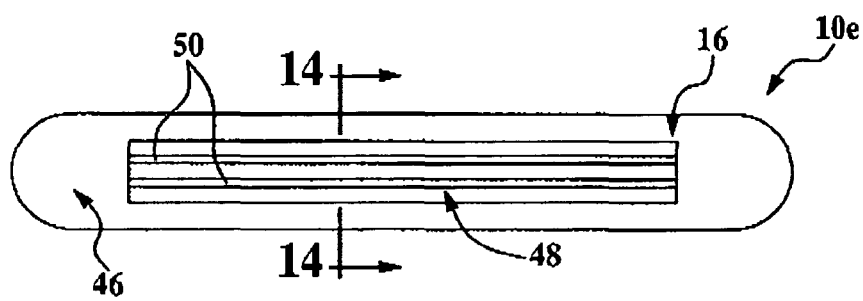
FIG. 13 is a plan illustration of another embodiment of a composite laminate structure, employing a slit tape reinforcement in the interlayer.
Figure 14:
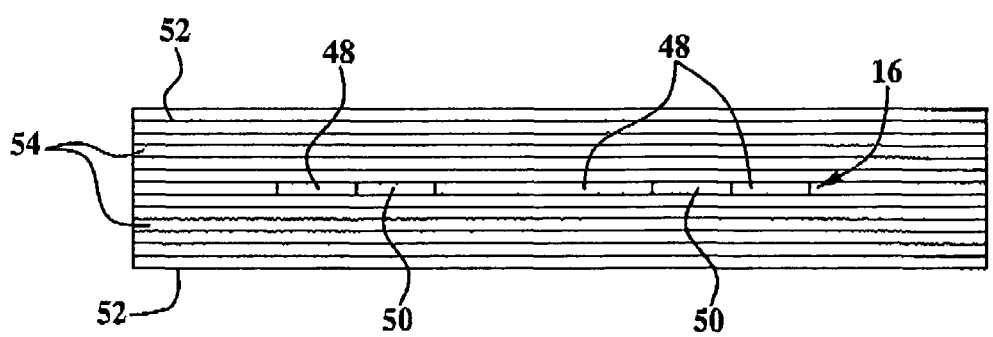
FIG. 14 is a sectional illustration taken along the line 14-14 in FIG. 13.

A further embodiment of the composite laminate structure 10e is shown in FIGS. 13 and 14. An aircraft skin section 46 includes an interlayer 16 patch comprising a strip of slit tape 50 of reinforcing material, such as carbon fiber reinforced epoxy. The tape 50 is disposed within a VEM matrix 48. The interlayer 16 is referred to as a "patch" because the width of the interlayer 16 is less than the width of the skin section 46, and the length of the interlayer 16 is less than the length of the skin section 46. The interlayer 16 is wholly disposed between a plurality of plies 54. The outer surfaces of the plies 54 are covered with a layer 52 of carbon fiber reinforced epoxy impregnated cloth.

Figure 15:
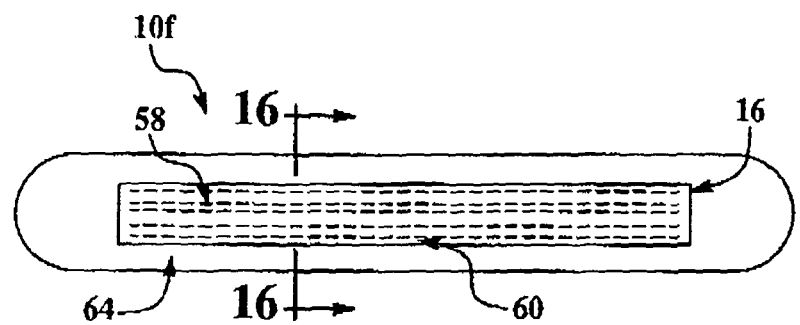
FIG. 15 is a plan illustration of another embodiment of the composite laminate damping structure having a perforated interlayer.
Figure 16:
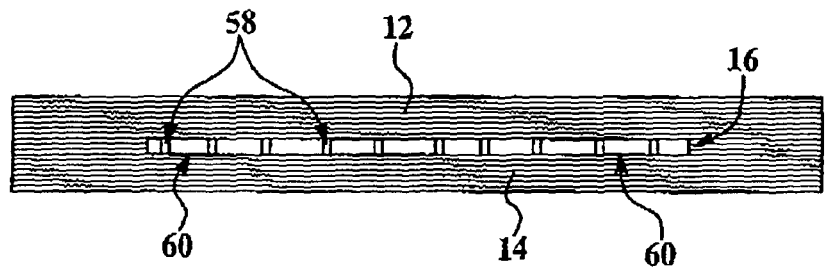
FIG. 16 is a sectional illustration taken along the line 16-16 in FIG. 15.

Attention is now directed to FIGS. 15 and 16 which illustrate another embodiment of a composite laminate structure 10f, such as a fuselage skin section 64, in which the interlayer 16 is formed by a film 60 of a suitable VEM in which a plurality of perforations 58 are formed that extend between laminate layers 12, 14. The film 60 may comprise, for example a viscoelastic rubber such as that identified by the trade name SMACTANE® available from SMAC in Toulon, France. The number and size of the perforations 58 will vary depending upon the particular application. The perforations 58, which pass completely through the interlayer 16, allow the migration of resin between the layers 12, 14 which, when cured, form rigid connections between layers 12, 14 that are surrounded by the VEM film matrix 60. The direct connection between layers 12, 14 provided by the resin that fills the perforations 58 reduces the possibility that laminate structure 10f may behave as a split laminate when the interlayer 16 is too soft.

Figure 17A:
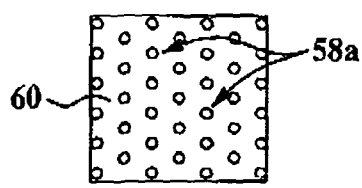
FIGS. 17a through 17c illustrate examples of perforation geometries that may be employed in the perforated interlayer shown in FIGS. 15 and 16.
Figure 17B:
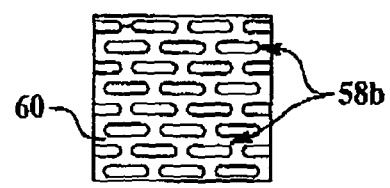
Figure 17C:
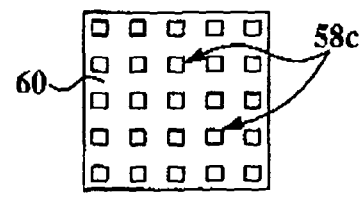

The perforations 58 may be laid out randomly or in a uniform pattern across the interlayer 16. The perforations 58 may have any of a variety of cross sectional geometries. For example, the cross sectional shape of the perforations 58 may be round as shown in FIG. 17a, elongate as shown in FIG. 17b or square as shown in FIG. 17c, or a combination of one or more of these or other geometries.

Figure 18:
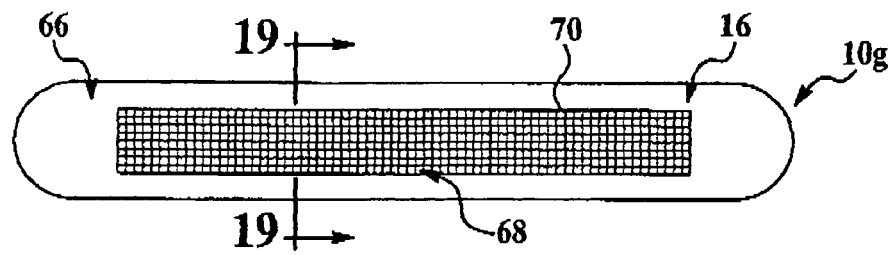
FIG. 18 is a plan illustration of another embodiment of the composite laminate structure having a interlayer reinforced with a net.
Figure 19:
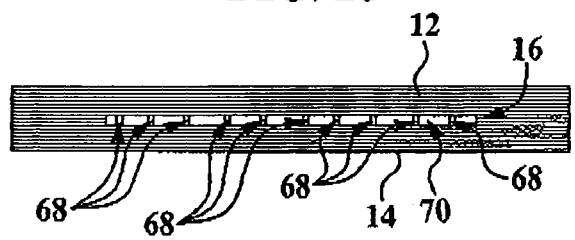
FIG. 19 is a sectional illustration taken along the line 19-19 in FIG. 18.

FIGS. 18 and 19 illustrate another embodiment of the composite laminate structure 10g, comprising a skin section 66. The skin section 66 includes an interlayer 16 comprising a single layer VEM net 68 impregnated with a VEM resin 70, generally similar to the laminate structure 10a in FIG. 2. The glass transition temperature Tg of the VEM net 68 is higher than that of the VEM resin 70 so that, over the full operating range of the aircraft, the VEM net 68 provides adequate stiffness and the VEM resin 70 remains relatively soft. In this embodiment, the interlayer 16 is wholly surrounded by the layers 12, 14 of laminate plies so as to be encapsulated, and therefore form a damping patch within the skin section 66.

In the case of each of the laminate structures 10-10g described above, the interlayer 16 is assembled in a lay-up with the first and second layers 12, 14, and are co-cured using conventional techniques, such as vacuum bagging or autoclaving, so the interlayer 16 becomes co-cured to the first and second layers 16, 18, producing a consolidated laminated structure 10-10g.

Figure 20:
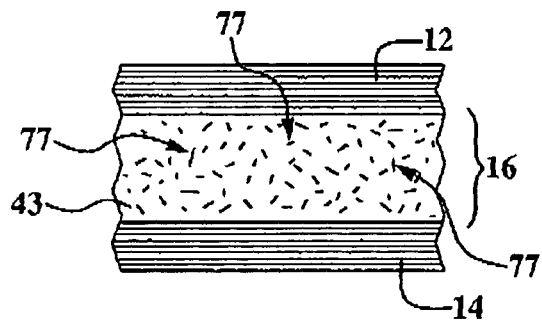
FIG. 20 is enlarged, fragmentary illustration of another embodiment of the composite laminate structure in which a damping interlayer is reinforced with particles.

Other variations of the damped laminate structures discussed above are possible. For example, as shown in FIG. 20, the interlayer 16 containing VEM matrix material 43 may be reinforced by mixing relatively stiff material into the VEM material 43 This reinforcing material may be micro (meter) sized particles 77 of chopped carbon or ceramic micro-balloons. Also, the particles 77 can be nano (meter) sized using multi-walled and single-walled nano-tubes or nano-fibers. These particles 77 or inclusions may be mixed into the damping polymer when it is still in its aqueous phase (before being formed into a thin film.) The micro-meter sized particles 77 are much stiffer than the VEM 43 and when dispersed into the VEM 43, the combination of the two materials (thru a Rule of Mixtures) is stiffer and stronger than the neat VEM 43, i.e., a VEM 43 not containing any reinforcing materials. The nano-sized particles 77 function largely on the atomic level of the molecules, and help increase the strength of ionic bond between molecules which increases the strength of the bond between the VEM 43 and carbon epoxy layers 12, 14.

Figure 21:
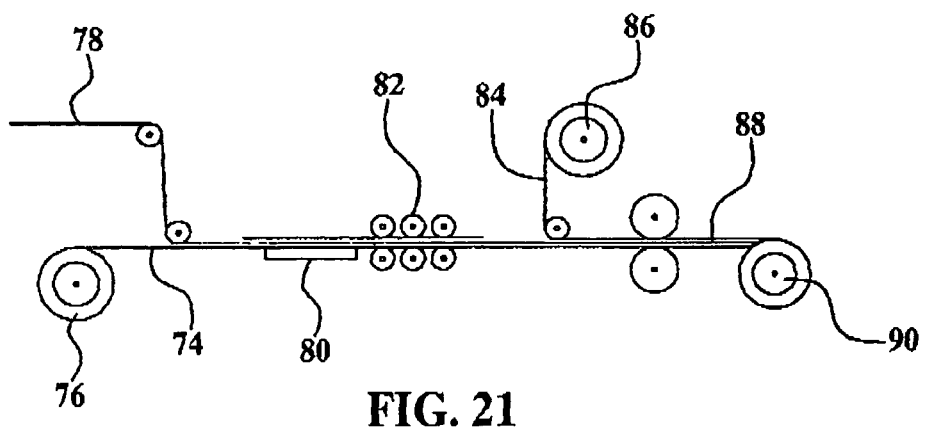
FIG. 21 is a diagrammatic illustration of apparatus for transferring a reinforced film onto a pre-preg used in fabricating composite laminate structures having damping interlayers.

FIG. 21 illustrates an apparatus for forming a pre-preg of a fiber reinforced epoxy resin matrix 78 and a VEM film 74. The VEM film 74 is fed from a continuous roll 76 along with a pre-preg 78 of a fiber reinforced epoxy resin material to a heating element 80. The heating element 80 preheats the pre-preg 78 and film 74 which are then passed through consolidating rollers 82 that bond the film 74 to the pre-preg 78. Release paper 84 is fed from a continuous roll 86 onto the surface of the pre-preg 78, and the resulting, final pre-preg 88 is accumulated on a roll 90.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A damped composite laminate, comprising:
a first and a second layer comprising a carbon fiber and a resin;
a third layer disposed between the first and second layers, the third layer including damping material comprising a first viscoelastic material having a first glass transition temperature and a reinforcement medium comprising a second viscoelastic material having a second glass transition temperature greater than the first glass transition temperature, the reinforcement medium comprising fiber material, the materials in the third layer different than the resin in the first and second layers; and,
a first barrier layer disposed between and contacting the first layer and the third layer, and a second barrier layer disposed between and contacting the second layer and the third layer, said first and second barrier layers being formed of a fabric of at least 0.0005 inch thick, the first barrier layer and the second barrier layer configured to substantially prevent intermixing of material comprising said first and second layers with material comprising said third layer.

2. The damped composite laminate of claim 1, wherein all sides of the third layer are surrounded by the first and second layers.

3. The damped composite laminate of claim 1, wherein the first layer and the second layer are characterized by a plane of orientation, and wherein the reinforcement medium includes fibers embedded in the viscoelastic material, the fibers positioned substantially in the same plane.

4. The damped composite laminate of claim 3, wherein the fibers are co-cured to the first and second layers.

5. The damped composite laminate of claim 1, wherein the first layer and the second layer are characterized by a plane of orientation, and wherein the fibers have a length extending a direction generally transverse to the plane of the first and second layers.

6. The damped composite laminate of claim 5, wherein the fibers are Z-fibers.

7. The damped composite laminate of claim 1, wherein:
the damping material includes a first viscoelastic material having a first glass transition temperature, and
the reinforcement medium includes fibers impregnated with a second viscoelastic material having a second glass transition temperature greater than the first glass transition temperature.

8. The damped composite laminate of claim 1, wherein:
the damping material includes a first viscoelastic material having a first glass transition temperature, and
the reinforcement medium includes an open weave of a second viscoelastic material embedded within the first viscoelastic material, the glass transition temperature of the second viscoelastic material being greater than the glass transition temperature of the first viscoelastic material.

9. The damped composite laminate of claim 1, wherein the reinforcement medium includes inclusions contained within the damping material.

10. The damped composite laminate of claim 9, wherein the inclusions include one of —
chopped carbon fibers,
fiberous strands,
z-fibers,
a split tape of fiber reinforced resin,
ceramic micro-balloons,
nano-fibers,
nano-tubes.

11. The damped composite laminate of claim 1, wherein the fiber material of the reinforcement medium includes a net formed of a first viscoelastic material.

12. The damped composite laminate of claim 11, wherein the damping material is formed of a second viscoelastic, and the net is impregnated with the second viscoelastic material.

13. The damped composite laminate of claim 1, wherein the reinforcement medium includes rigid connections between the respective barrier layers and third layer.

14. The damped composite laminate of claim 13, wherein:
the third layer includes perforations, and
the rigid connections include resin disposed within the perforations and extending between the first and second barrier layers.

15. A composite laminate structure, comprising:
at least first and second layers comprising a fiber reinforced with a resin;
a third layer positioned between the first and second layers, the third layer comprising a viscoelastic material having a first glass transition temperature and a fiber reinforcement having a second glass transition temperature greater than the first glass transition temperature, the third layer substantially excluding the resin of the first and second layers; and,
a first barrier layer disposed between and contacting the first layer and the third layer, and a second barrier layer disposed between and contacting the second layer and the third layer, said first and second barrier layers being formed of a thermoplastic fabric preventing intermixing of material comprising said first and second layers with material comprising said third layer.

16. The composite laminate of claim 15, wherein the viscoelastic material is thermoplastic polyurethane.

17. The composite laminate of claim 15 wherein the fiber reinforcement includes a fiber net extending through the viscoelastic material, generally parallel to the first and second layers.

18. The composite laminate of claim 17, wherein the fiber net is impregnated with one of a viscoelastic material and an epoxy resin.

19. The composite laminate of claim 15, wherein the fiber reinforcement includes individual fibers dispersed within the viscoelastic material.

20. The composite laminate of claim 15, wherein the fiber reinforcement includes a plurality of Z-fibers extending between the first and second barrier layers for reinforcing the viscoelastic material.

21. The composite laminate of claim 15, wherein the fiber reinforcement is co-cured to the first and second barrier layers.

22. The composite laminate of claim 15, wherein the third layer is co-cured with the first and second layers.

23. A damped composite laminate, comprising:
a first layer comprising a carbon fiber reinforced with a plastic material;
a second layer comprising a carbon reinforced with the plastic material; and
a third layer disposed between the first and second layers, the third layer including damping material comprising a first viscoelastic material having a first glass transition temperature and a reinforcement medium comprising a second viscoelastic material having a second glass transition temperature greater than the first glass transition temperature, the reinforcement medium comprising fiber material, the third layer substantially excluding the plastic material of the first layer and the second layer.

* * * * *

UNITED STATES PATENT AND TRADEMARK OFFICE
CERTIFICATE OF CORRECTION

Page 1 of 1

PATENT NO. : 9,511,571 B2
APPLICATION NO. : 11/656626
DATED : December 6, 2016
INVENTOR(S) : Montgomery et al.

It is certified that error appears in the above-identified patent and that said Letters Patent is hereby corrected as shown below:

In the Claims

Column 8, Line 47, change "wherein the fibers have" to -- wherein fibers embedded in the viscoelastic material have --

Signed and Sealed this
Thirteenth Day of February, 2018

Andrei Iancu
*Director of the United States Patent and Trademark Office*